United States Patent
Patel et al.

(10) Patent No.: US 9,766,684 B2
(45) Date of Patent: Sep. 19, 2017

(54) TELEMETRY FOR POWER AND THERMAL MANAGEMENT

(71) Applicant: Apple Inc., Cupertino, CA (US)

(72) Inventors: Parin Patel, San Francisco, CA (US); Keith Cox, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 269 days.

(21) Appl. No.: 14/336,377

(22) Filed: Jul. 21, 2014

(65) Prior Publication Data

US 2016/0018871 A1 Jan. 21, 2016

(51) Int. Cl.
G06F 1/32 (2006.01)

(52) U.S. Cl.
CPC .......... *G06F 1/3234* (2013.01); *G06F 1/3206* (2013.01)

(58) Field of Classification Search
CPC .............................. G06F 1/3206; G06F 1/3234
See application file for complete search history.

(56) References Cited

U.S. PATENT DOCUMENTS

| | | | |
|---|---|---|---|
| 5,272,382 A | 12/1993 | Heald et al. | |
| 5,687,734 A * | 11/1997 | Dempsey | A61B 5/0006 128/903 |
| 6,702,457 B1 * | 3/2004 | Smith | G01K 3/005 361/103 |
| 7,051,306 B2 | 5/2006 | Hoberman et al. | |
| 7,062,661 B1 | 6/2006 | Na | |
| 7,304,599 B2 * | 12/2007 | Lee | H03M 1/002 341/164 |
| 7,903,825 B1 * | 3/2011 | Melanson | H03G 3/32 381/103 |
| 7,944,384 B2 * | 5/2011 | Fredriksen | H03M 1/1225 341/141 |
| 8,335,936 B2 | 12/2012 | Jonsson et al. | |
| 8,798,205 B2 * | 8/2014 | Ecker | H04W 52/0229 375/271 |
| 9,345,892 B2 * | 5/2016 | Corndorf | A61N 1/37276 |
| 2007/0030190 A1 * | 2/2007 | Lee | H03M 1/002 341/155 |
| 2007/0049133 A1 | 3/2007 | Conroy et al. | |
| 2009/0276642 A1 * | 11/2009 | Burton | H02M 3/1584 713/300 |

(Continued)

*Primary Examiner* — Abdelmoniem Elamin
(74) *Attorney, Agent, or Firm* — Blakely Sokoloff Taylor & Zafman LLP

(57) ABSTRACT

Power and thermal management that uses trigger circuits to activate power telemetry. A power consumption level of a subsystem is monitored using a trigger circuit while power telemetry mode for the subsystem is inactive. When the monitored power consumption level exceeds a threshold, the trigger circuit activates the power telemetry mode of operation in which telemetry information of the subsystem is provided to a controller. Power consumption of the subsystem is then managed by the controller based on telemetry information obtained under the power telemetry mode. The controller can determine whether a power consumption level of the subsystem has dropped below a threshold, based on telemetry information obtained under the power telemetry mode. The controller may terminate the power telemetry mode when the power consumption level has dropped below the threshold. Other embodiments are also described and claimed.

41 Claims, 9 Drawing Sheets

(56) References Cited

U.S. PATENT DOCUMENTS

| | | | |
|---|---|---|---|
| 2010/0185263 A1* | 7/2010 | Stevenson | A61B 5/0031 607/60 |
| 2010/0198279 A1* | 8/2010 | Corndorf | A61N 1/37276 607/3 |
| 2014/0046609 A1* | 2/2014 | Yang | G01R 21/133 702/60 |
| 2014/0112408 A1* | 4/2014 | Ecker | H04W 52/0229 375/271 |

\* cited by examiner

TELEMETRY FOR POWER AND THERMAL MANAGEMENT

FIELD

An embodiment of the invention is related to managing the performance of an electronic device, including power and thermal management.

BACKGROUND

In the realm of power-limited electronic devices such as smartphones, laptop computers, tablet computers, and portable music playing and gaming devices, there are a number of electronic subsystems in each device that can operate relatively independently in that each subsystem can be called upon to perform a task at any given moment and each subsystem has its own thermal and power performance behavior. Examples of such subsystems are a system-on-a-chip (SoC) circuit, a central processing unit (CPU), a graphics processing unit (GPU), a cellular phone network communications interface, a digital camera, a touchscreen, a display backlight system, a radio frequency (RF) transceiver system, a battery charging system, and various sensors such as a proximity sensor and an inertial sensor. For example, a cellular phone call will cause the cellular RF transceiver and a baseband communications processor to consume significantly more power which in turn causes a rapid increase in temperature at their locations inside a smartphone, while the temperature in other subsystems might rise much more slowly. When the detected power and/or thermal performance of a power-limited electronic device exceeds a certain pre-determined level, a power and/or thermal management system in the device may "throttle" the power consumption of one or more of the subsystems so as prevent excessive temperatures or excessive battery discharge.

SUMMARY

Without access to accurate thermal and power consumption information of its individual subsystems, a portable device will throttle the subsystems arbitrarily or bluntly, causing unnecessary performance degradation. Power telemetry inside a portable device however can be costly in terms of its own power consumption and thermal impact. An embodiment of the invention is a method that monitors a power consumption level of a subsystem of the device while power telemetry mode for the subsystem is inactive. When the monitored power consumption level exceeds a threshold, the trigger circuit activates a power telemetry mode of operation in which telemetry information of the subsystem is provided to a controller. Power consumption of the subsystem is then managed by the controller based on telemetry information obtained under the power telemetry mode. In one embodiment, the controller then determines whether a power consumption level of the subsystem has dropped below a threshold, based on telemetry information obtained under the power telemetry mode. The controller may terminate the power telemetry mode when the power consumption level has dropped below the threshold.

In one embodiment, the controller can determine whether to terminate the telemetry when the power consumption meets predetermined criteria, based on information obtained under the power telemetry mode. In one embodiment, the telemetry may be discontinued when a power consumption level falls below a threshold. In another embodiment, the telemetry may be discontinued when an average power consumption level drops below a threshold (for example, a PI or PID loop may be run during telemetry and the telemetry may be deactivated when the integral term is at or below zero). When there are multiple subsystems monitored during power telemetry mode, deactivation may occur when each subsystem meets a criteria for that subsystem, when an average or total consumption of the monitored subsystems meets a criteria, or the like.

Under the power telemetry mode, sensing measurements of the subsystem are obtained and sent to the controller. In one embodiment, the sensing measurements include one or more of a power supply current measurement, a power supply voltage measurement, and a thermal (temperature) measurement. The sensing measurements are digitized through an analog-to-digital conversion (ADC) before they are sent to the controller.

In another embodiment, an electronic system includes several constituent subsystems that are to perform different operations of the system. Each subsystem is coupled with an analog-to-digital (A/D) converting sensing circuit. The electronic system also includes several trigger circuits, each of which is to monitor a power consumption level of one or more subsystems without using the A/D converting sensing circuits. The electronic system also includes a controller that is to receive digitized sensing measurements of a particular subsystem from a respective A/D converting sensing circuit when a trigger circuit monitoring the particular subsystem is triggered. In one embodiment, the trigger circuit monitoring the particular subsystem is triggered when the monitored power consumption level of the particular subsystem exceeds a threshold. The digitized sensing measurements of the particular subsystem are generated by the A/D converting sensing circuit coupled to the particular subsystem. The controller is further to manage power consumption of the particular subsystem based on the received digitized sensing measurements.

In one embodiment, the low power trigger circuit uses a voltage based comparator, and its threshold is a threshold voltage. A current mirror off a linear regulator, e.g. a low dropout regulator (LDO), generates a voltage that is compared with the threshold voltage, the result of which is a telemetry mode activation or enable signal. In another embodiment, the low power trigger circuit performs an averaging of power switch on-time of a switched-mode power supply (SMPS), and compares the average on-time voltage to a voltage threshold. In another embodiment, the low power trigger circuit is implemented with a counter that counts reference clock cycles between pulses of discontinuous current mode (DCM) operation of a SMPS. In yet another embodiment, the output of the voltage based comparator is counted against a reference clock to provide a detection duration to the trigger circuit.

The above summary does not include an exhaustive list of all aspects of the invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
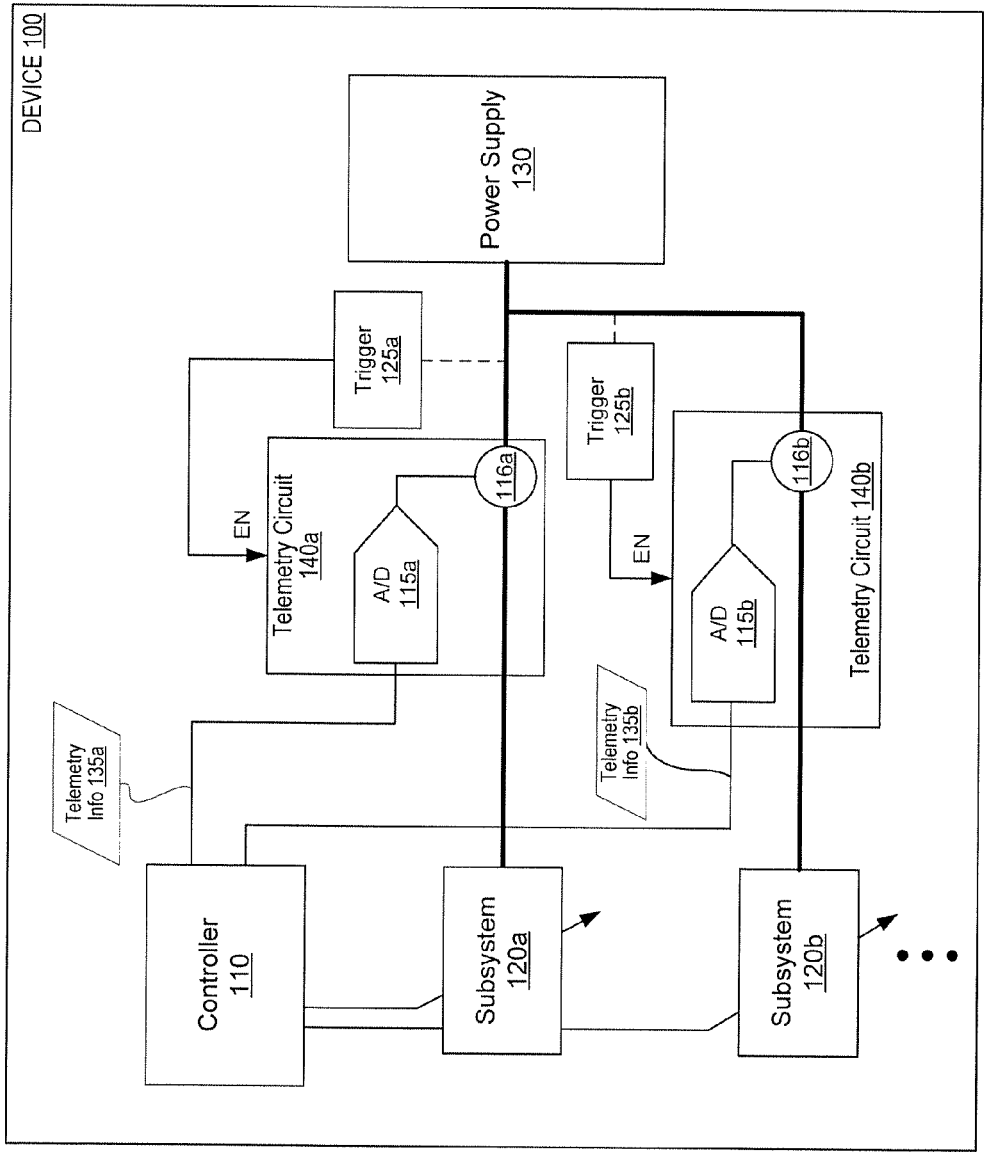
FIG. 1 illustrates a block diagram of an electronic device that uses trigger circuits to activate power telemetry.

Power telemetry for performance management of a device using trigger circuits is described. In the following description, numerous specific details are set forth to provide thorough explanation of embodiments of the invention. It will be apparent, however, to one skilled in the art, that embodiments of the invention may be practiced without these specific details. In other instances, well-known components, structures, and techniques have not been shown in detail in order not to obscure the understanding of this description.

Reference in the Specification to "one embodiment" or "an embodiment" means that a particular feature, structure, or characteristic described in connection with the embodiment can be included in at least one embodiment of the invention. The appearances of the phrase "in one embodiment" in various places in the Specification do not necessarily all refer to the same embodiment.

Telemetry is the automated process by which measurements are made and data are collected at remote points, and transmitted to receiving equipment for monitoring. Power telemetry is the process by which power consumption measurements and/or thermal measurements of one or more subsystems of an electronic device are made and collected for those subsystems, and then transmitted to a controller for monitoring and managing of the power and thermal levels of those subsystem.

In a power-limited electronic system, it can be useful for a controller of the system to obtain information about power consumption of individual subsystems, in order to optimize performance within given constraints (e.g., power and/or thermal constraints). A subsystem's power consumption information can be sensed by a sensing circuit, and the power consumption information can be sent to the controller, for input into one or more power, performance, and thermal control loops. However, the sensing and transmitting of power consumption information may cost an impractical amount of power in low power operating modes, especially with multiple power supplies and subsystems.

Therefore, a trigger circuit can be implemented to trigger power telemetry for a subsystem only when the power consumption level at the subsystem has risen to exceed a threshold level. The trigger circuit is designed to consume much less power than the power otherwise would be consumed under the power telemetry mode. In one embodiment, this trigger circuit can be a voltage based comparator. The trigger circuit consumes minimal power because it does not perform analog-to-digital conversion (ADC), nor does it transmit digitized sensing information to a relatively remote controller. Once the trigger of the trigger circuit fires, the power management unit can then activate power telemetry for the subsystem. Power telemetry uses a sensing circuit to measure power consumption information (e.g., current and voltage information) and/or thermal information for the subsystem, and then sends digitized measurements to the controller. Once the controller receives the power telemetry information, it can use the information to optimize performance of the device. In one embodiment, the controller optimizes performance of the device by throttling activities of the subsystem, based on the power telemetry information. The controller can also decide, based on the power telemetry information, when the power consumption level of the subsystem has dropped low enough such that it would be appropriate to disable the power telemetry, e.g. via a software command.

FIG. 1 illustrates a block diagram of an electronic device 100 of one embodiment that uses trigger circuits to activate power telemetry. The electronic device 100 can be a smartphone, a laptop computer, a tablet computer, a portable music playing and gaming device, or any power-limited electronic device. As illustrated in FIG. 1, the device 100 includes a controller 110, first subsystem 120a, second subsystem 120b, a power supply 130, first telemetry circuit 140a, second telemetry circuit 140b, first trigger circuit 125a, and second trigger circuit 125b. The first telemetry circuit 140a includes a first sensing circuit 116a and a first analog-to-digital (A/D) converter 115a. The second telemetry circuit 140b includes a second sensing circuit 116b and a second A/D converter 115b.

Each of the subsystems 120a and 120b performs one or more operations for the device 100. Each subsystem can include one or more components such as a system-on-a-chip (SoC) circuit, a central processing unit (CPU), a graphics processing unit (GPU), a cellular phone network communications interface, a digital camera, a touchscreen, a display backlight system, a radio frequency (RF) transceiver system, a battery charging system, or various sensors such as a proximity sensor, an inertial sensor, combinations thereof, or the like.

The power supply 130 provides power to the subsystems 120a and 120b. Even though it is illustrated that the two subsystems 120a and 120b sharing the same power supply 130, one of ordinary skill in the art would recognize that the two subsystems can alternatively use different power supplies, as will be illustrated in FIG. 2 below.

The first trigger circuit 125a monitors the power consumption level of the subsystem 120a. In one embodiment, the trigger circuit 125a monitors by sensing the current on the power supply line to the subsystem 120a. In another embodiment, the trigger circuit 125a monitors by sensing current within the power supply 130. When the trigger circuit 125a monitors by sensing current within the power supply 130, it can be used to monitor the aggregated power consumption level of several subsystems supported by the power supply 130 because the current in the power supply may be indicative of more than just the power drawn by the subsystem 120a. If the power consumption level of the subsystem 120a has exceeded a pre-determined threshold (e.g., based on the current monitored by the trigger circuit 125a exceeds a threshold), the trigger circuit 125a triggers to activate the power telemetry mode for that subsystem (e.g., by activating the telemetry circuit 140a). For example, in some instances the trigger circuit 125a may activate the A/D converter 115a. In other instances, the A/D converter 115a may already be active, but the controller 110 may not sample or otherwise perform any power telemetry operations until it receives an indication from the trigger circuit 125a. The pre-determined threshold can be on the scale of 100s of milliwatt (mW), e.g. 200 mW, for a SoC in a mobile phone.

Under the power telemetry mode, the sensing circuit 116a senses accurate measurements of the subsystem 120; the A/D converter 115a performs A/D conversion on sensing measurements collected by the sensing circuit 116a, and sends the digitized sensing measurements as power telemetry information 135a to the controller 110. In one embodiment, the power telemetry information 135a can include one or more of a power supply current measurement, a power supply voltage measurement, and a thermal (temperature) measurement. The second trigger circuit 125b, the A/D converter 115b, and the sensing circuit 116b perform similar operations for subsystem 120b.

In one embodiment, the device 100 may be configured such that the activation of a trigger circuit activates telemetry for multiple subsystems. For example, triggering of either trigger circuit 125a or 125b may result in telemetry of both subsystems 120a and 120b. In these instances, the two trigger circuits could feed into a shared element (such as an OR gate), which in turn is connected to each of telemetry circuits 140a and 140b.

A trigger circuit may include a voltage-based comparator. The implementation of the trigger circuit may be dependent on the power source. For example and in one embodiment, each of the trigger circuits 125a and 125b may be a voltage based comparator for linear low dropout regulators (LDOs). In one embodiment, a trigger circuit is implemented with a current minor off the main pass device which could generate a voltage to compare with a threshold voltage. In one embodiment, the trigger circuit triggers when the voltage is greater than the threshold voltage. An example of trigger circuit for LDO will be described in FIG. 4 below.

In another embodiment for switch mode power supplies (SMPS), each of the trigger circuits 125a and 125b may also be a voltage based comparator. In one embodiment, a trigger circuit is implemented with a resistance/capacitance (RC) averaging of the switch on-time, or based on a counter counting reference clocks between pulses of DCM operation. In one embodiment, the trigger circuit triggers when the RC averaging of the switch on-time exceeds a pre-determined threshold, or the number of reference clocks between pulses of DCM operation is less than a pre-determined threshold. An example of trigger circuit for SMPS will be described in FIG. 5 below.

In one embodiment, the output of the voltage comparator of a trigger circuit can be de-bounced or counted against a reference clock, to provide a detection duration to the trigger mechanism. In one embodiment, the trigger circuit is triggered when the sensed power consumption level exceeds a pre-determined threshold during the entire detection duration. In another embodiment, the trigger circuit is triggered when the sensed power consumption level exceeds the pre-determined threshold over a certain percentage of time (e.g., 80%) over the detection duration. In one embodiment, for CPU/GPU/SoC silicon die level thermal management, the detection duration of the trigger may be set to 10 s of milliseconds. Preferably, the detection duration of the trigger mechanism is long enough to avoid spurious triggering of the power telemetry due to load transients, while fast enough to allow the controller to start tracking and managing power consumption of subsystem before things start to run away.

Generally, one or more controllers may manage the power consumption of the first and second subsystems 120a and 120b. In one embodiment, the controller 110 manages the power consumption of the subsystems 120a and 120b. In another embodiment, different controllers may monitor and control the individual subsystems. When the power telemetry mode is activated for one or both of subsystems, the controller can optimize the performance of the device 100 by managing the power consumption of the power telemetry activated subsystem based on the power telemetry information 135a and/or 135b it receives. In one embodiment, the controller throttles the performance of the subsystem based on the power telemetry information. In one embodiment, the subsystems 120a and 120b are CPU and GPU, respectively, of the device 100. The controller reduces power consumption of the CPU and GPU through clock throttling for the CPU and/or the GPU based on the power telemetry information. In one embodiment, the controller reduces power consumption by reducing power states, duty cycling, and/or managing the workload of the processors.

The sensing circuit, the A/D converter, and the transmission and use of digitized power telemetry information all consume power. But these power consumptions may be insignificant when compared to the improved overall performance of the device 100 when power telemetry is activated. Using one or more trigger circuits to control activation of power telemetry may reduce the amount of time that the telemetry is activated, which may allow for selective performance improvement with reduced overall power drain.

When the power telemetry for a subsystem is disabled or otherwise not active, the controller manages power consumption of the subsystem without power telemetry information while a corresponding trigger circuit monitors the power consumption level of the subsystem. In some instances, when the device 100 is initially turned on, the controller 110 disables the power telemetry mode for some or all of the subsystems to save power. In other instances, power telemetry mode may be active for one or more subsystems when the device 100 is initially turned on, and may subsequently be disabled (e.g., when the power consumption of a given subsystem reaches a threshold, such as discussed below). When the power consumption level of the subsystem rises to exceed a pre-determined threshold, the trigger circuit triggers to activate power telemetry for the subsystem. The corresponding sensing circuit for the subsystem then obtains measurements of the subsystem. The corresponding A/D converter for the subsystem digitizes the measurements, and sends the digitized measurements as power telemetry information to the controller 110.

The controller 110 uses the power telemetry information to control the power consumption of the subsystem in order to optimize the performance of device 100. The controller 110 can also determine whether to terminate the telemetry when the power consumption meets predetermined criteria, based on information obtained under the power telemetry mode. In one embodiment, the telemetry may be discontinued when a power consumption level falls below a threshold. In another embodiment, the telemetry may be discontinued when an average power consumption level drops below a threshold (for example, a PI or PID loop may be run during telemetry and the telemetry may be deactivated when the integral term is at or below zero). When there are multiple subsystems monitored during power telemetry mode, deactivation may occur when each subsystem meets one or more criteria for that subsystem, when an average or total consumption of the monitored subsystems meets a criteria, or the like.

In one embodiment, the threshold for stopping power telemetry represents the same power consumption level of the subsystem as the threshold for triggering the trigger circuit. In one embodiment, these two thresholds represent two different power consumption levels of the subsystem.

The device 100 was described above for one embodiment of the invention. One of ordinary skill in the art will realize that in other embodiments, this module can be implemented differently. For instance, in one embodiment described above, certain modules are implemented as software modules, for example, to be executed by an application processor or a SoC. However, in another embodiment, some or all of the modules might be implemented by hardware or programmable logic gates, which can be dedicated application specific hardware (e.g., an ASIC chip or component) or a general purpose chip (e.g., a microprocessor or FPGA). In one embodiment, instead of having two subsystems, the device 100 can have more than two subsystems, as well as the additional power supplies, trigger circuits, sensing circuits, and A/D converters associated with the additional subsystems.

Figure 2:
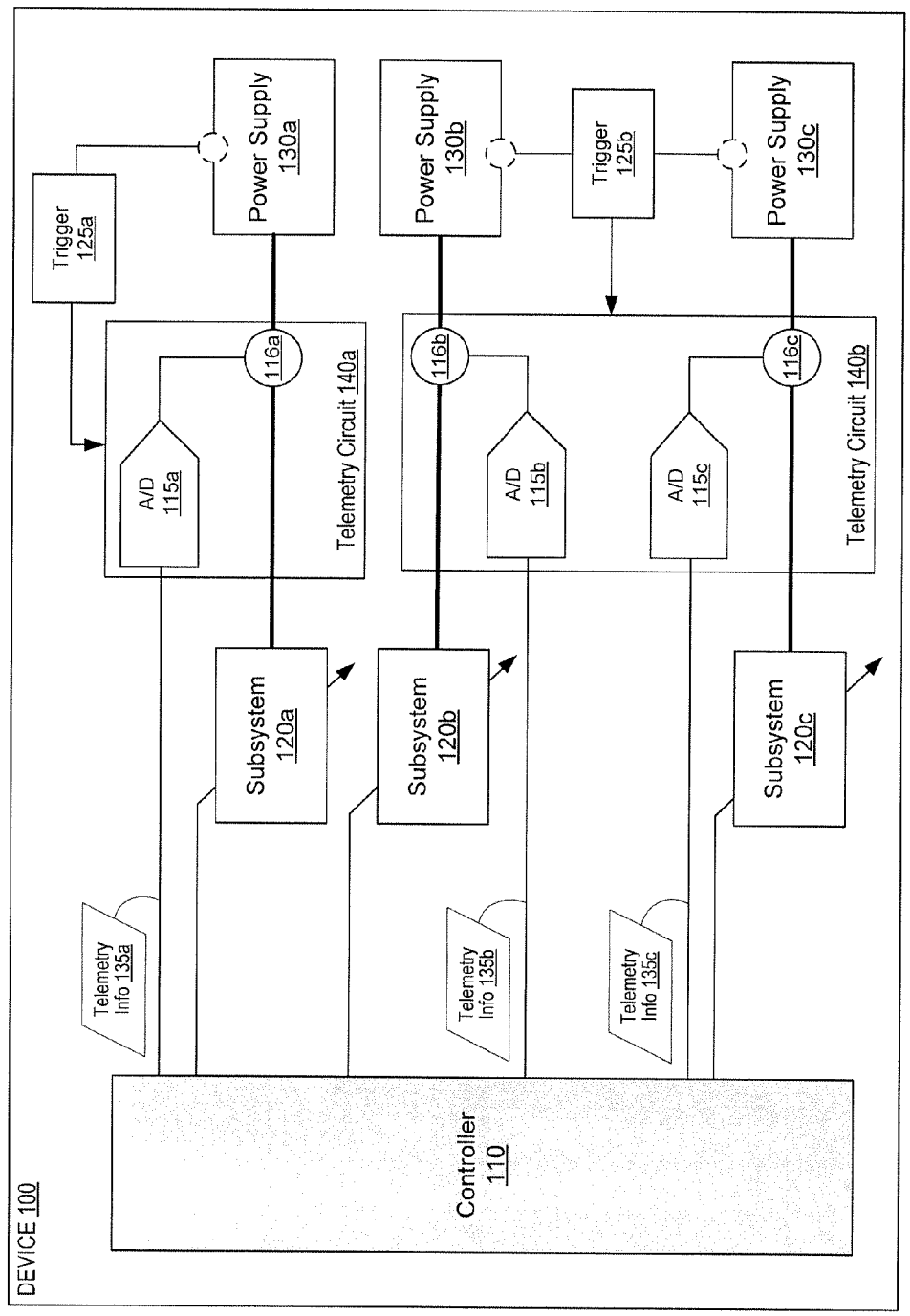
FIG. 2 illustrates a block diagram of another embodiment that uses trigger circuits to activate power telemetry.

FIG. 2 illustrates a block diagram of another embodiment that uses trigger circuits to activate power telemetry. As illustrated in the figure, the device 100 includes a controller 110, first subsystem 120a, second subsystem 120b, third subsystem 120c, first telemetry circuit 140a, second telemetry circuit 140b, first trigger circuit 125a, second trigger circuit 125b, first power supply 130a, second power supply 130b, and third power supply 130c. The first telemetry circuit 140a includes first sensing circuit 116a and first A/D converter 115a. The second telemetry circuit 140b includes second sensing circuit 116b, third sensing circuit 116c, second A/D converter 115b, and third A/D converter 115c.

The first subsystem 120a and its associated telemetry circuit 140a, trigger circuit 125a, and power supply 130a perform operations similar to those described in FIG. 1 above. In addition, FIG. 2 shows that multiple subsystems can share the same trigger circuit. For example, subsystems 120b and 120c share the trigger circuit 125b, which monitors the power consumption level of both subsystems. If the power consumption level of one or both of subsystems 120b and 120c exceeds a pre-determined threshold, the trigger circuit 125b triggers to activate power telemetry mode for both subsystems, e.g. by activating the telemetry circuit 140b. The first subsystem 120a and its associated telemetry circuit 140a can be optional in this embodiment.

In one embodiment, the trigger circuit 125b triggers when the aggregated power consumption level of subsystems 120b and 120c exceeds a pre-determined threshold. In another embodiment, the trigger circuit 125b triggers when the minimum of the power consumption levels of subsystems 120b and 120c exceeds the pre-determined threshold. In yet another embodiment, the trigger circuit 125b triggers when the maximum of the power consumption levels of subsystems 120b and 120c exceeds the pre-determined threshold. One of ordinary skill in the art would recognize that the subsystems need not have the same threshold for triggering a respective trigger circuit, and different subsystems may have different thresholds. For example, the subsystem 120b may have a first predetermined threshold and subsystem 120c may have a second predetermined threshold different than the first predetermined threshold. In some of these embodiments, trigger circuit 125b may trigger when either the power consumption of subsystem 120b exceeds the first predetermined threshold or the power consumption of subsystem 120c exceeds the second predetermined threshold.

As illustrated in FIG. 2, each subsystem has a separate power supply to provide power. One of ordinary skill in the art would realize that, instead of having separate power supplies, multiple subsystems can share the same power supply, as described in FIG. 1 above. In FIG. 2, each trigger circuit monitors the power consumption level of one or more subsystems by sensing current within corresponding power supplies. One of ordinary skill in the art will recognize that the trigger circuit can also monitor by sensing the current on the power supply line to the subsystems.

Once the trigger circuit 125b fires, the sensing circuits 116b and 116c are activated to collect accurate sensing measurements of subsystem 120b and 120c, the A/D converters 115b and 115c convert the sensing measurements into digital measurements and send the digitized measurements as power telemetry information 135b and 135c to the controller 110. In one embodiment, the power telemetry information 135b and 135c can include one or more of a power supply current measurement, a power supply voltage measurement, and a thermal (temperature) measurement.

When the power telemetry for one or more subsystems is disabled or otherwise not active, the controller manages power consumption of the subsystems without power telemetry information while a corresponding trigger circuit monitors the power consumption level of the subsystems. In some instances, when the device 100 is initially turned on, the controller 110 disables the power telemetry mode for one or both of subsystems 120b and 120c to save power. In other instances, power telemetry mode may be active for one or both of subsystems 120b and 120c when the device 100 is initially turned on, and may subsequently be disabled (e.g., when the power consumption of the subsystems reaches a threshold, such as discussed below). When the power consumption level of one or both of subsystems 120b and 120c rises to exceed a pre-determined threshold, the trigger circuit 125b triggers to activate power telemetry for both subsystems, e.g. by activating the telemetry circuit 140b. The sensing circuits 116b and 116c then obtain accurate sensing measurements of subsystems 120b and 120c, respectively. The A/D converters 115b and 115c digitize the sensing measurements from the corresponding sensing circuit, and send the digitized measurements as power telemetry information 135b and 135c, respectively, to the controller 110.

The controller 110 uses the power telemetry information 135b and 135c to control the power consumption of the subsystems 120b and 120c in order to optimize the performance of device 100. The controller 110 can also use the power telemetry information 135b and 135c to determine that the power consumption level of the subsystems 120b and 120c has dropped below a pre-determined threshold and stops power telemetry for one or both of them, e.g. through a software or hardware command. In one embodiment, the controller 110 disables power telemetry for both subsystems 120b and 120c when the aggregated power consumption level of them falls below a pre-determined threshold. In another embodiment, the power telemetry for subsystems 120b and 120c may be discontinued when an average power consumption level drops below a threshold (for example, a PI or PID loop may be run during telemetry and the telemetry may be deactivated when the integral term is at or below zero). In one embodiment, deactivation may occur when each subsystem meets a criteria for that subsystem, when an average or total consumption of the monitored subsystems meets a criteria, or the like. In one embodiment, the criteria for both subsystems 120*b* and 120*c* are the same. In another embodiment, each subsystem has its own criteria.

The device 100 of FIG. 2 was described above for one embodiment of the invention. One of ordinary skill in the art will realize that in other embodiments, this module can be implemented differently. For instance, in one embodiment described above, certain modules are implemented as software modules, for example, to be executed by an application processor or a SoC. However, in another embodiment, some or all of the modules might be implemented by hardware or programmable logic gates, which can be dedicated application specific hardware (e.g., an ASIC chip or component) or a general purpose chip (e.g., a microprocessor or FPGA). In one embodiment, the device 100 can have m subsystems and n trigger circuits, where m is greater than or equal to n. In one embodiment, the device 100 can have more than one controller for performance management based on power telemetry information activated by trigger circuits. In one embodiment, instead of having power telemetry information for each subsystem sent to the controller through separate channels, the power telemetry information for two or more subsystems can be sent to a controller through a shared transmission channel, as will be described in FIGS. 3A and 3B below.

Figure 3A:
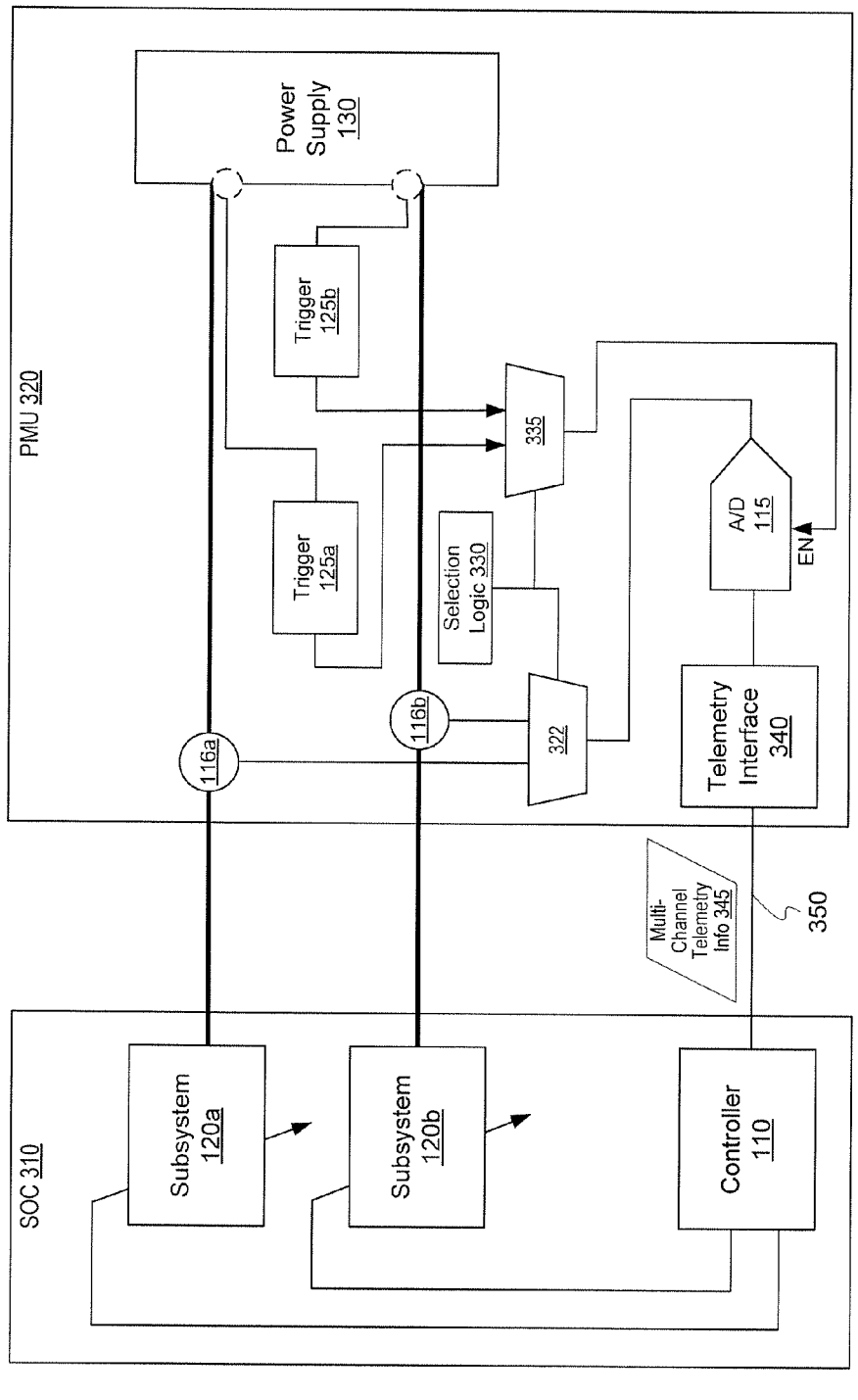
FIG. 3A illustrates a block diagram of an electronic system of one embodiment that includes a system-on-a-chip circuit and a power management unit.

FIG. 3A illustrates a block diagram of an electronic system 300 of one embodiment that includes a SoC 310 and a power management unit (PMU) 320. The electronic system 300 can be a smartphone, a laptop computer, a tablet computer, a portable music playing and gaming device, or any power-limited electronic device. In one embodiment, the electronic system is the device 100 described in FIGS. 1 and 2 above.

The SoC 310 is an integrated circuit that has a plurality of components of a computer or other electronic system into a single chip. The SoC 310 includes a controller 110, a first subsystem 120*a*, and a second subsystem 120*b*. The PMU 320 is a microcontroller that governs power functions of the electronic system 300. The PMU 320 includes a power supply 130, a telemetry interface 340, a first sensing circuit 116*a*, a second sensing circuit 116*b*, a first trigger circuit 125*a*, a second trigger circuit 125*b*, an A/D converter 115, a selection logic 330, and two multiplexers 322 and 335. It should be appreciated that the division of components between SoC 310 and PMU 320 as shown in FIG. 3A is exemplary, and that controller 110, first subsystem 120*a*, second subsystem 120*b*, power supply 130, telemetry interface 340, first sensing circuit 116*a*, second sensing circuit 116*b*, first trigger circuit 125*a*, second trigger circuit 125*b*, A/D converter 115, selection logic 330, and multiplexers 322 and 335 may be included in any suitable portion or portions of the electronic system 300.

The trigger circuits 125*a* and 125*b* monitor the power consumption level of subsystems 120*a* and 120*b*, respectively. If the power consumption level of the subsystem 120*a* has exceeded a pre-determined threshold, the trigger circuit 125*a* triggers. Similarly, the trigger circuit 125*b* triggers if the power consumption level of the subsystem 120*b* has exceeded a pre-determined threshold.

The selection logic 330 sends a selection signal to multiplexer 322. The selection logic 330 is used to switch among multiple subsystems in order to share the common A/D converter 115 and the power telemetry channel 350. The selection logic 330 determines, at each particular moment, which subsystem power consumption should be checked and whether power telemetry should be activated for that subsystem as a consequence. The selection logic 330 sends a selection signal to multiplexers 322 and 335. For example and in one embodiment, at a first time $T_1$, the selection logic 330 decides to check the power consumption level of subsystem 120*a* and sends corresponding selection signal to multiplexers 322 and 335. The multiplexer 322 selects sensing measurements obtained by the sensing circuit 116*a* and sends them to the A/D converter 115 for conversion. The multiplexer 335 selects the output of the trigger circuit 125*a* and send the output to the A/D converter 115 at the same time. When the trigger circuit 125*a* triggers because the power consumption level of subsystem 120*a* is above a pre-determined threshold level, power telemetry for subsystem 120*a* is activated and the A/D converter 115 is activated to perform A/D conversion on the sensing measurements received from the sensing circuit 116*a*. The digitized measurements are then sent to the telemetry interface 340.

At a second time $T_2$ following the first time $T_1$, the selection logic 330 decides to check the power consumption level of subsystem 120*b* and sends corresponding selection signal to multiplexers 322 and 335. The multiplexer 322 selects sensing measurements obtained by the sensing circuit 116*b* and sends them to the A/D converter 115 for conversion. The multiplexer 335 selects the output of the trigger circuit 125*b* and send the output to the A/D converter 115 at the same time. When the trigger circuit 125*b* triggers because the power consumption level of subsystem 120*b* is above a pre-determined threshold level, power telemetry for subsystem 120*b* is activated and the A/D converter 115 is activated to perform A/D conversion on the sensing measurements received from the sensing circuit 116*b*. The digitized measurements are then sent to the telemetry interface 340.

The telemetry interface 340 sends the digitized sensing measurements as power telemetry information 345 to the controller 110 through a power telemetry channel 350. The power telemetry channel 350 is a shared transmission channel for sending power telemetry information to controller 110 for two or more subsystems, e.g., subsystems 120*a* and 120*b*. In one embodiment, the power telemetry channel 350 is a time-division multiplexing (TDM) channel. In one embodiment, the power telemetry channel 350 avoids the power overhead of having the controller's CPU manage the data transfer. In one embodiment, the power telemetry channel 350 is a Serial Peripheral Interface (SPI) communication channel that controller 110 already uses for Dynamic Voltage and Frequency Scaling (DVFS). In another embodiment, the power telemetry channel 350 is a serial interface with a DMA engine, where the telemetry interface 340 can push the telemetry information 345 to the controller 110's memory.

When the power telemetry for a subsystem is disabled or otherwise not active, the controller manages power consumption of the subsystem without power telemetry information while a corresponding trigger circuit monitors the power consumption level of the subsystem. In some instances, when the system 300 is initially turned on, the controller 110 disables the power telemetry mode for some or all of the subsystems to save power. In other instances, power telemetry mode may be active for one or more subsystems when the system 300 is initially turned on, and may subsequently be disabled (e.g., when the power consumption of a given subsystem reaches a threshold, such as discussed below). When the power consumption level of a selected subsystem rises to exceed a pre-determined threshold, the corresponding trigger circuit triggers to activate power telemetry for the subsystem. The A/D converter 115 digitizes the sensing measurements for the subsystem, and sends the digitized measurements to the telemetry interface 340. The telemetry interface 340 then sends digitized measurements as power telemetry information 345 to the controller 110 through the power telemetry channel 350.

The controller 110 uses the power telemetry information 345 to control the power consumption of the selected subsystem in order to optimize the performance of the electronic system 300. For example and in one embodiment, the subsystems 120a and 120b are CPU and GPU, respectively. The controller 110 manages the power consumption of the CPU and GPU through clock throttling for the CPU and/or the GPU based on the power telemetry information 345. In one embodiment, the controller 110 reduces power consumption by reducing power states, duty cycling, and/or managing the workload of the processors. The controller 110 can also use the power telemetry information 345 to determine that the power consumption level of the selected subsystem has dropped below a pre-determined threshold and stops power telemetry for the subsystem, e.g. through a software or hardware command.

The embodiment of FIG. 3A allows for selective monitoring between the two subsystems (e.g., the multiplexer 335 can alternate looking at the triggers 125a and 125b). In this embodiment, telemetry will only be sent for the subsystem 120a when the trigger 125a is activated, and telemetry for the subsystem 120b will be sent only when the trigger 125b is activated. In another embodiment, triggering of either trigger will cause both subsystems to report telemetry. That is, both triggers are monitored simultaneously for activation, and both subsystems report telemetry when either trigger is activated, as will be described below in FIG. 3B.

Figure 3B:
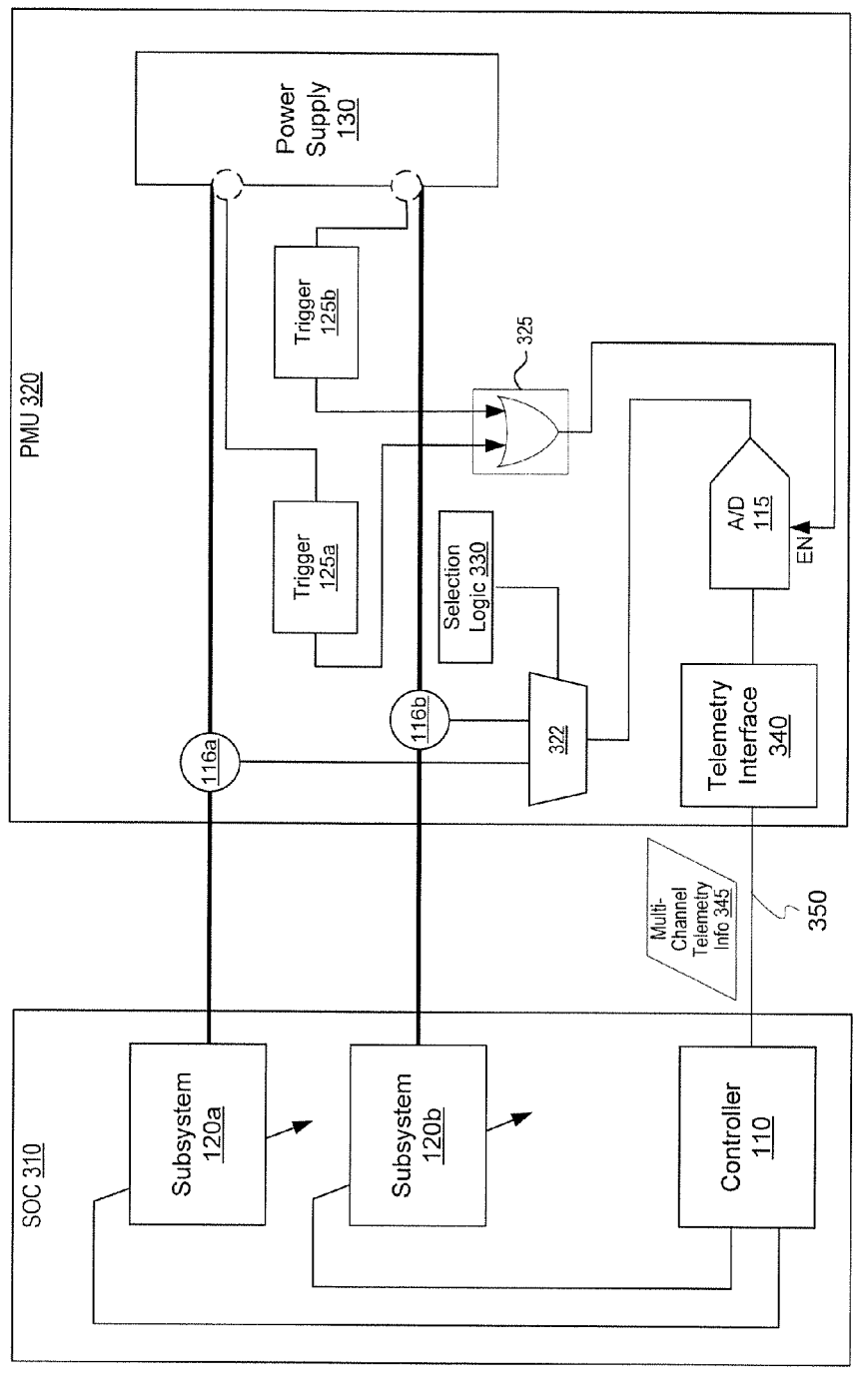
FIG. 3B illustrates a block diagram of an electronic system of another embodiment that includes a system-on-a-chip circuit and a power management unit.

FIG. 3B illustrates a block diagram of an electronic system 300 of another embodiment that includes the SoC 310 and the power management unit (PMU) 320. The SoC 310 is similar to the one described in FIG. 3A above. The PMU 320 is different from the one described in FIG. 3A above in that an OR gate 325 replaces the multiplexer 335. Again, the inclusion of various components in SoC 310 and PMU 320 is exemplary, and controller 110, first subsystem 120a, second subsystem 120b, power supply 130, telemetry interface 340, first sensing circuit 116a, second sensing circuit 116b, first trigger circuit 125a, second trigger circuit 125b, A/D converter 115, selection logic 330, multiplexer 322, and OR gate 325 may be included in any suitable portion or portions of the electronic system 300.

The trigger circuits 125a and 125b monitor the power consumption level of subsystems 120a and 120b, respectively. If the power consumption level of the subsystem 120a has exceeded a pre-determined threshold, the trigger circuit 125a triggers. Similarly, the trigger circuit 125b triggers if the power consumption level of the subsystem 120b has exceeded a pre-determined threshold.

The selection logic 330 sends a selection signal to multiplexer 322. The selection logic 330 is used to switching among multiple subsystems in order to share the common A/D converter 115 and the power telemetry channel 350. The selection logic 330 determines, at each particular moment, the sensing measurements of which subsystem should be sent to the A/D converter 115 for possible A/D conversion.

The OR gate 325 takes the outputs of the trigger circuits 125a and 125b as its inputs and sends its output to the A/D converter 115. If either trigger 125a or trigger 125b has engaged, then the telemetry mode is activated and telemetry data transmitted for both subsystems 120a and 120b. The telemetry data is multiplexed by the selection logic 330 switching between sensing circuits 116a and 116b. In one embodiment, the OR gate 325 has hysteresis to prevent rapid activation/deactivation switching for the A/D converter 115.

The telemetry interface 340 sends the digitized sensing measurements as multi-channel power telemetry information 345 to the controller 110 through the power telemetry channel 350. The power telemetry channel 350 is a shared transmission channel for sending power telemetry information to controller 110 for two or more subsystems, e.g., subsystems 120a and 120b. In one embodiment, the power telemetry channel 350 is a time-division multiplexing (TDM) channel. In one embodiment, the power telemetry channel 350 avoids the power overhead of having the controller's CPU manage the data transfer. In one embodiment, the power telemetry channel 350 is a Serial Peripheral Interface (SPI) communication channel that controller 110 already uses for Dynamic Voltage and Frequency Scaling (DVFS). In another embodiment, the power telemetry channel 350 is a serial interface with a DMA engine, where the telemetry interface 340 can push the multi-channel telemetry information 345 to the controller 110's memory.

One of ordinary skill in the art would realize that FIGS. 3A and 3B has greater applicability than SoC. A power telemetry channel can be shared by two or more subsystems of the device, regardless where the subsystems are located. For example and in one embodiment, a power telemetry channel can be shared by several subsystems where one or more of those subsystems are not located on the same chip.

Figure 4:
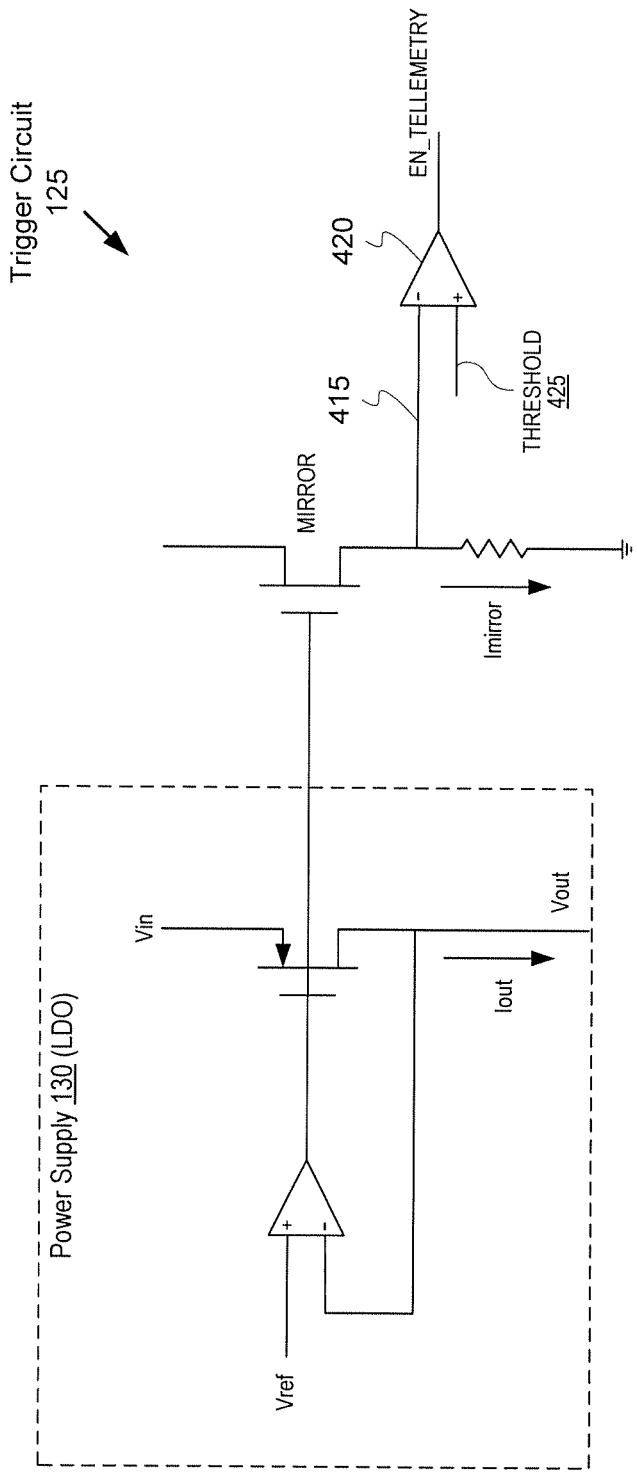
FIG. 4 illustrates a trigger circuit of one embodiment.

FIG. 4 illustrates a trigger circuit 125 of one embodiment. Specifically, this figure shows the trigger circuit 125 implemented with a current ($I_{mirror}$) mirrored off a power supply 130 (i.e., an LDO) which could generate a voltage to compare with a threshold voltage. The mirrored off current $I_{mirror}$ is almost identical to the output current ($I_{out}$) of the power supply 130. The trigger circuit 125 can be the trigger circuits described in FIGS. 1-3 above. The trigger circuit 125 includes a comparator 420 that compares the mirrored off voltage 415 with the threshold voltage 425. In one embodiment, if the mirrored off voltage 415 is greater than the threshold voltage 425, the trigger circuit 125 triggers. In one embodiment, the comparator 420 may be a hysteresis comparator.

Figure 5:
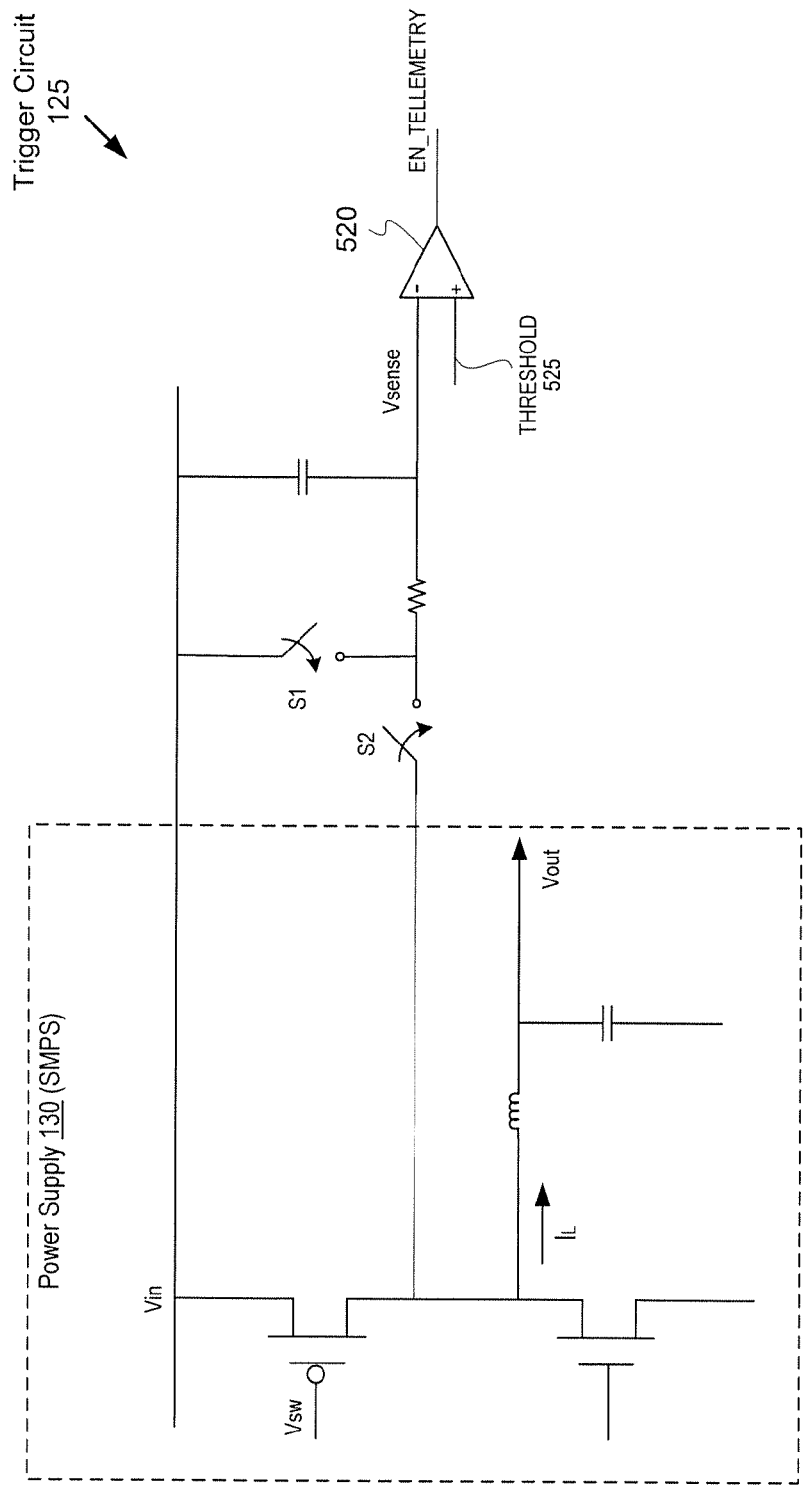
FIG. 5 illustrates a trigger circuit of another embodiment.

FIG. 5 illustrates a trigger circuit 125 of another embodiment. Specifically, this figure shows the trigger circuit 125 implemented with a current ($V_{sense}$) generated off a power supply 130 (i.e., a SMPS) to compare with a threshold 525. The trigger circuit 125 can be the trigger circuits described in FIGS. 1-3 above. In one embodiment, the power supply 130 regulates output voltage ($V_{out}$) by opening switch $S_2$ and simultaneously closing switch $S_1$; then opening $S_1$ and simultaneously closing $S_2$. The trigger circuit 125 includes a comparator 520 that compares $V_{sense}$ with the threshold 525. In one embodiment, the trigger circuit 125 is implemented with an RC averaging of the switch on-time, or based on a counter counting reference clocks between pulses of DCM operation.

Figure 6A:
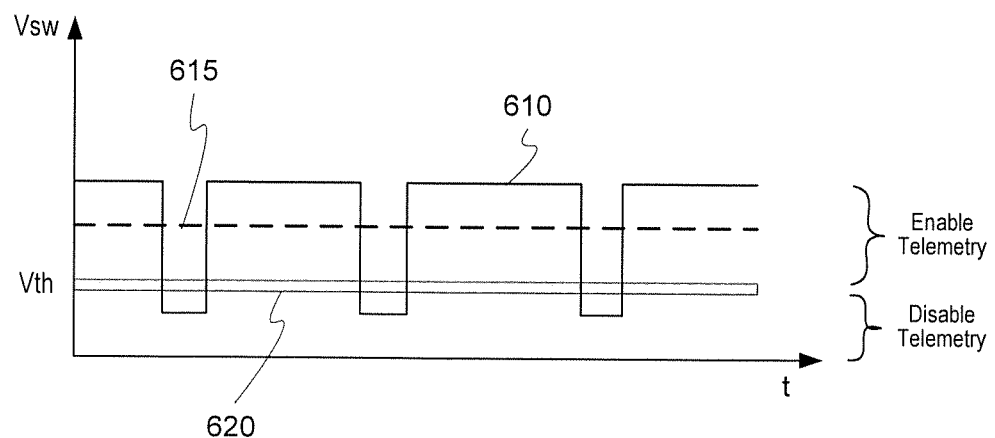
FIG. 6A illustrates an example of using averaging of the switch on-time to implement one embodiment of a trigger circuit.

FIG. 6A illustrates an example of using averaging of the switch on-time to implement one embodiment of a trigger circuit. As shown in FIG. 6A, waveform 610 represents the power switching control signal of a SMPS. In one embodiment, the SMPS is the power supply 130 described in FIG. 5 above. Line 615 represents the averaging of the switch on-time of the SMPS. The band 620 represents the threshold voltage of the trigger circuit. The threshold voltage is represented as a voltage band because the comparator 520 described in FIG. 5 above is hysteresis comparator. In another embodiment, the threshold voltage could be represented as a single line.

In one embodiment, high averaging of the switch on-time represents high power consumption level. Therefore, the averaging of the switch on-time can be compared with a threshold to determine if the trigger circuit should trigger to activate power telemetry. As illustrated in FIG. 6A, if line 615 is above band 620, the trigger circuit should be triggered to activate power telemetry. If line 615 is below band 620, power telemetry should be disabled.

Figure 6B:
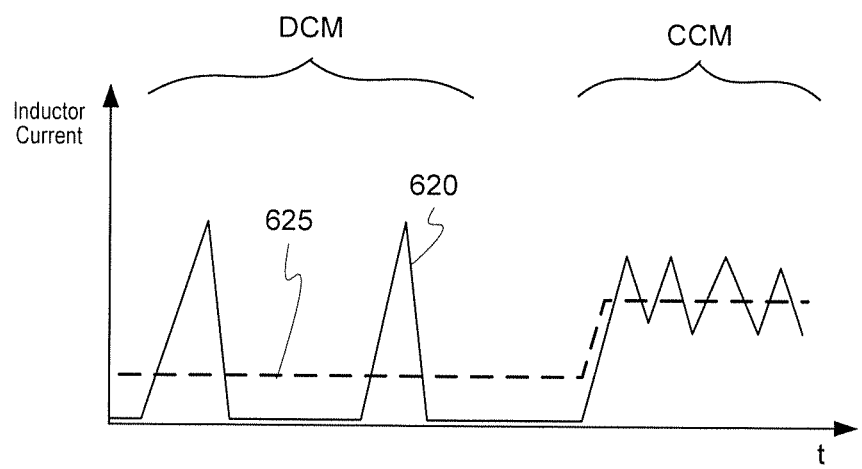
FIG. 6B illustrates an example of using inductor current to implement one embodiment of a trigger circuit.

FIG. 6B illustrates an example of using inductor current to implement one embodiment of a trigger circuit. As shown in FIG. 6B, waveform 620 represents the inductor current of a SMPS. In one embodiment, the SMPS is the power supply 130 described in FIG. 5 above. In one embodiment, the inductor current is the inductor current $I_L$ illustrated in FIG. 5. Line 625 represents the averaging of the inductor current. As illustrated in FIG. 6B, when the SMPS is performing DCM operation, the average of the inductor current is low; when the SMPS is performing continuous current mode (CCM) operation, the average of the inductor current is high. Therefore, the averaging of the inductor current can be compared with a threshold to determine if the trigger circuit should trigger to activate power telemetry. In one embodiment, when the SMPS is performing DCM operation, power telemetry is disabled; when the SMPS is performing CCM operation, the trigger circuit is triggered and power telemetry is activated.

Figure 7:
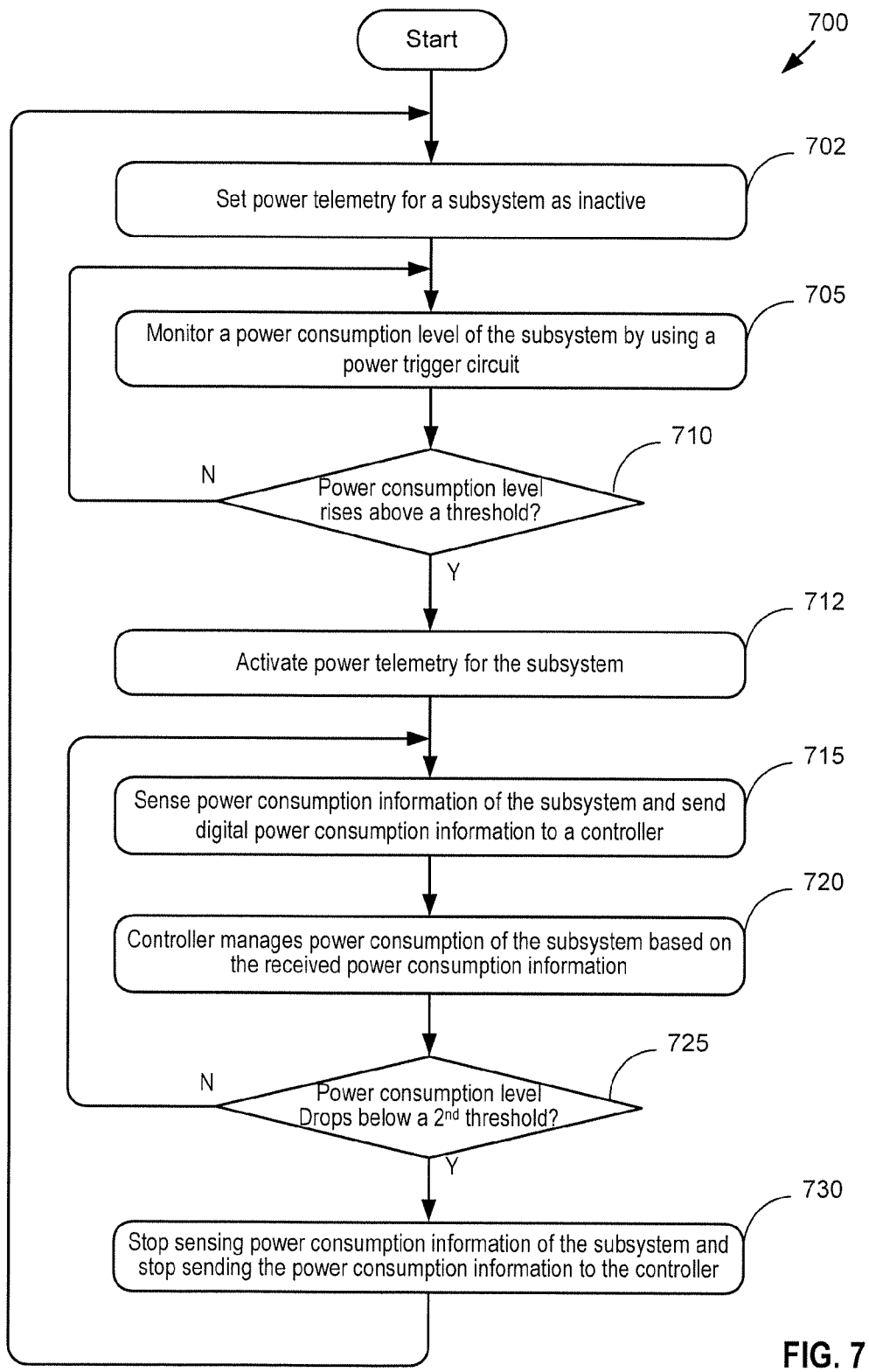
FIG. 7 illustrates a flowchart of one embodiment of operations performed in a device that uses a trigger circuit to activate power telemetry.

FIG. 7 illustrates a flowchart of one embodiment of operations performed in a device that uses a trigger circuit to activate power telemetry, referred to as process 700. In one embodiment, the device (e.g., device 100 of FIGS. 1 and 2, system 300 of FIGS. 3A and 3B) executes process 700 when performing power and thermal management. As illustrated in FIG. 7, process 700 begins by setting (at block 702) power telemetry for a subsystem of the device as inactive. At block 705, process 700 monitors a power consumption level of the subsystem by using a trigger circuit. In one embodiment, the trigger circuit is one of the trigger circuits described in FIGS. 1-5 above.

At block 710, process 700 determines whether the monitored power consumption level has risen above a threshold power consumption level. In one embodiment, the threshold power consumption level is represented by a threshold voltage value. In another embodiment, the threshold power consumption level is represented by an average switch on-time of the SMPS output. In yet another embodiment, the threshold power consumption level is represented by a number of reference clocks between pulses of DCM operations of the SMPS output.

If the monitored power consumption level has exceeded the threshold power consumption level, process 700 activates (at block 712) power telemetry for the subsystem by triggering the trigger circuit. If the monitored power consumption level has not exceeded the threshold power consumption level, process 700 loops back to block 705 to continue monitoring the power consumption level of the subsystem using the trigger circuit.

At block 715, process 700 senses power consumption information of the subsystem (e.g., using an A/D based sensing circuit) and sends the digital power consumption information to a controller, e.g. through a power telemetry channel 350 described in FIGS. 3A and 3B above. In one embodiment, the operations of block 715 are performed by sensing circuits 116a-116c and A/D converters 115 and 115a-115c described in FIGS. 1-3 above.

At block 720, a controller manages power consumption of the subsystem based on the received power consumption information. For example and in one embodiment, the controller manages power and thermal performance of the subsystem by throttling power supply voltage and/or clock frequency of the subsystem. In one embodiment, the power consumption information is the power telemetry information 135a-135c and 345 described in FIGS. 1-3 above. In one embodiment, the controller here is controller 110 of FIGS. 1-3B described above.

Process 700 determines (at block 725) whether the power consumption level of the subsystem has dropped below a power consumption threshold based on the power consumption information received when power telemetry is active. If the power consumption level of the subsystem has dropped below the power consumption threshold, process 700 stops (at block 730) sensing power consumption information of the subsystem and stops sending the power consumption information to the controller, e.g., by deactivating the A/D based sensing. Process 700 then loops back to block 702 to set power telemetry for the subsystem as inactive.

If it is determined (at block 725) that the power consumption level of the subsystem has not dropped below the power consumption threshold, process 700 loops back to block 715 to continue power telemetry. In one embodiment, process 700 ends when the device is turned off or the device receives a command to stop using the trigger circuit to activate power telemetry.

One of ordinary skill in the art will recognize that process 700 is a conceptual representation of the operations executed by a device to activate power telemetry using a trigger circuit. The specific operations of process 700 may not be performed in the exact order shown and described. The specific operations may not be performed in one continuous series of operations, and different specific operations may be performed in different embodiments. Furthermore, process 700 could be implemented using several sub-processes, or as part of a larger macro process.

Figure 8:
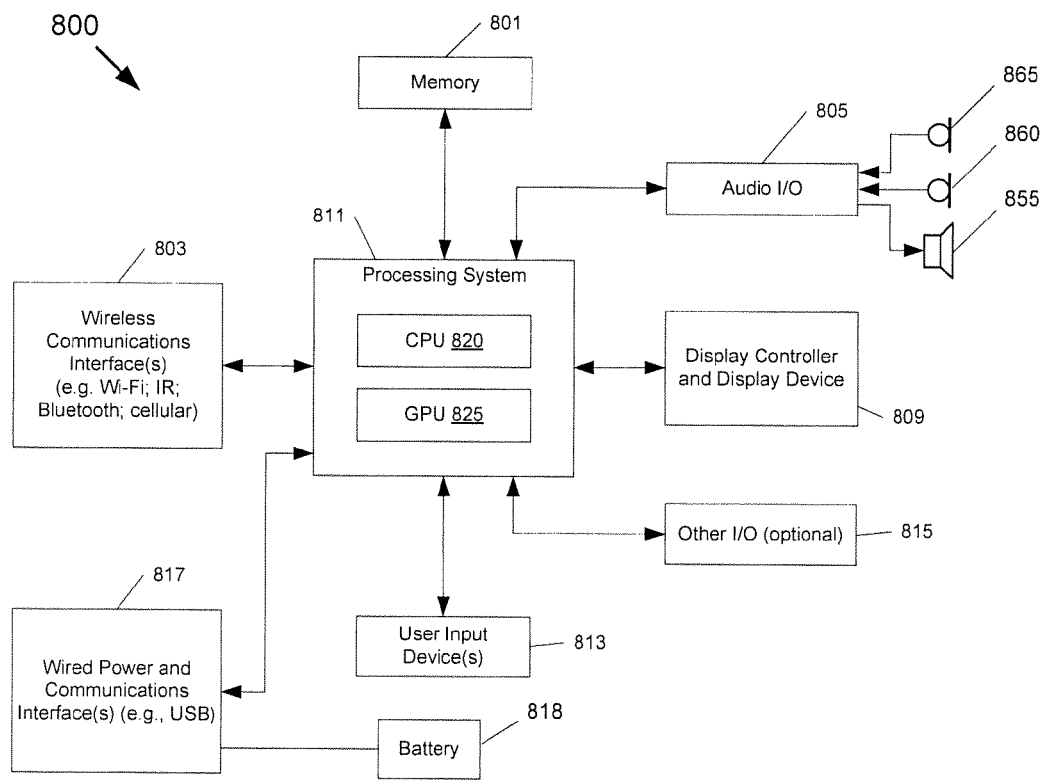
FIG. 8 illustrates one example of a data processing system, in which an embodiment of the invention may be implemented.

FIG. 8 shows an example of a data processing system 800, in which an embodiment of the invention may be implemented. Specifically, this figure shows a data processing system 800. The data processing system 800 shown in FIG. 8 includes a processing system 811, which may be one or more microprocessors or a system-on-a-chip integrated circuit. In one embodiment, the processing system 811 includes a CPU subsystem 820 and a GPU subsystem 825. In one embodiment, the controller that manages power and thermal performance of the data processing system 800 is implemented by the CPU subsystem 820. In another embodiment, the controller is a separate subsystem by itself (not shown). The data processing system 800 also includes memory subsystem 801 for storing data and programs for execution by the processing system 811. The data processing system 800 also includes an audio input/output subsystem 805, which may include a primary microphone 865, a secondary microphone 860, and a speaker 855, for example, for playing back music or providing telephone functionality through the speaker and microphones.

A display controller and display device subsystem 809 provide a digital visual user interface for the user; this digital interface may include a graphical user interface similar to that shown on a Macintosh computer when running the OS X operating system software, or an Apple iPhone when running the iOS operating system, etc. The system 800 also includes one or more wireless communications interfaces subsystem 803 to communicate with another data processing system. A wireless communications interface may be a WLAN transceiver, an infrared transceiver, a Bluetooth transceiver, and/or a cellular telephony transceiver. It will be appreciated that additional components, not shown, may also be part of the system 800 in certain embodiments, and in certain embodiments fewer components than shown in FIG. 8 may also be used in a data processing system. The system 800 further includes one or more wired power and communications interfaces subsystem 817 to communicate with another data processing system. The wired power and communications interface may be a USB port, etc. and may connect to a battery 818.

The data processing system 800 also includes one or more user input devices 813, which allow a user to provide input to the system. These input devices may be a keypad or keyboard, or a touch panel or multi touch panel. The data processing system 800 also includes an optional input/output device 815 which may be a connector for a dock. It will be appreciated that one or more buses, not shown, may be used to interconnect the various components as is well known in the art. The data processing system shown in FIG. 8 may be a handheld device or a personal digital assistant (PDA), or a cellular telephone with PDA-like functionality, or a handheld device which includes a cellular telephone, or a media player such as an iPod®, or a device which combines aspects or functions of these devices such as a media player combined with a PDA and a cellular telephone in one device or an embedded device or other consumer electronic devices. In other embodiments, the data processing system 800 may be a network computer or an embedded processing device within another device or other type of data processing systems, which have fewer components or perhaps more components than that shown in FIG. 8.

The foregoing discussion merely describes some exemplary embodiments of the invention. One skilled in the art will readily recognize from such discussion, from the accompanying drawings, and from the claims that various modifications can be made without departing from the spirit and scope of the invention.

What is claimed is:

1. An electronic system for performance management comprising:
a plurality of subsystems;
a plurality of analog-to-digital (A/D) converting sensing circuits;
a plurality of trigger circuits, wherein each trigger circuit is to monitor a power consumption level of one or more subsystems of the plurality of subsystems without using the A/D converting sensing circuits, and wherein one or more of the trigger circuits comprises a voltage-based comparator that compares i) a voltage generated by a current mirror off of a linear regulator, with ii) a threshold voltage, and triggers when the monitored power consumption level of the one or more subsystems exceeds a threshold; and
a controller that is to receive digitized sensing measurements of a particular subsystem from a respective one of the A/D converting sensing circuits when a trigger circuit monitoring the particular subsystem is triggered.

2. The electronic system of claim 1, wherein each of the plurality of subsystems is coupled with a respective A/D converting sensing circuit, wherein the sensing measurements of the particular subsystem are generated by its respective A/D converting sensing circuit.

3. The electronic system of claim 1, wherein the controller is further to manage power consumption of the particular subsystem based on the received digitized sensing measurements.

4. The electronic system of claim 1, wherein the digitized sensing measurements comprise one or more of a power supply current measurement, a power supply voltage measurement, or a thermal measurement.

5. An electronic system comprising:
a subsystem;
an analog-to-digital (A/D) converting sensing circuit that is to obtain digitized sensing measurements of the subsystem;
a trigger circuit that is to monitor a power consumption level of the subsystem, wherein the trigger circuit comprises a voltage-based comparator that compares i) a voltage generated by a current mirror off of a linear regulator, with ii) a threshold voltage, and that indicates when the trigger circuit is triggered; and
a controller that is to receive the digitized sensing measurements of the subsystem from the A/D converting sensing circuit when the trigger circuit is triggered.

6. The electronic system of claim 5 further comprising a power supply that is to supply power to the subsystem, wherein the power supply comprises the linear regulator.

7. The electronic system of claim 5, wherein the trigger circuit monitors the power consumption level of the subsystem without using the A/D converting sensing circuit.

8. The electronic system of claim 5, wherein the trigger circuit is triggered when the monitored power consumption level of the subsystem exceeds a threshold.

9. The electronic system of claim 5, wherein the subsystem is a first subsystem, the electronic system further comprising a second subsystem.

10. The electronic system of claim 9, wherein the trigger circuit also monitors a power consumption level of the second subsystem.

11. The electronic system of claim 9, wherein the trigger circuit is a first trigger circuit, the electronic system further comprising a second trigger circuit that is to monitor a power consumption level of the second subsystem.

12. The electronic system of claim 5, wherein the controller is configured to manage power consumption of the subsystem based on the received digitized sensing measurements.

13. The electronic system of claim 12, wherein the digitized sensing measurements comprise one or more of a power supply current measurement, a power supply voltage measurement, or a thermal measurement.

14. An electronic system for performance management comprising:
a plurality of subsystems;
a plurality of analog-to-digital (A/D) converter circuits;
a plurality of trigger circuits, wherein each trigger circuit is to monitor a power consumption level of one or more subsystems of the plurality of subsystems without using the A/D converter circuits, wherein one or more of the trigger circuits performs an averaging of power switch on-time of a switched-mode power supply (SMPS) to produce an average on-time voltage, and comprises a voltage-based comparator that compares the average on-time voltage with a threshold voltage, and triggers when the monitored power consumption level of the one or more subsystems exceeds a threshold; and
a controller that is to receive digitized sensing measurements of a particular subsystem from a respective one of the A/D converter circuits when a trigger circuit that is monitoring the particular subsystem is triggered.

15. The electronic system of claim 14, wherein each of the plurality of subsystems is coupled with a respective A/D converter circuit, wherein the sensing measurements of the particular subsystem are generated by its respective A/D converter circuit.

16. The electronic system of claim 14, wherein the controller is configured to manage power consumption of the particular subsystem based on the received digitized sensing measurements.

17. The electronic system of claim 14, wherein the digitized sensing measurements comprise one or more of a power supply current measurement, a power supply voltage measurement, or a thermal measurement.

18. An electronic system for performance management comprising:
a plurality of subsystems;
a plurality of analog-to-digital (A/D) converter circuits;
a plurality of trigger circuits, wherein each trigger circuit is to monitor a power consumption level of one or more subsystems of the plurality of subsystems without using the A/D converter circuits, wherein one or more of the trigger circuits comprises a counter that counts reference clock cycles between pulses of discontinuous current mode (DCM) operation of a switched-mode power supply (SMPS), and is triggered when the monitored power consumption level of the one or more subsystems exceeds a threshold; and
a controller that is to receive digitized sensing measurements of a particular subsystem from a respective one of the A/D converter sensing circuits when a trigger circuit that is monitoring the particular subsystem is triggered.

19. The electronic system of claim 18, wherein each of the plurality of subsystems is coupled with a respective one of the plurality of A/D converter circuits, wherein the sensing measurements of the particular subsystem are generated by its respective A/D converter circuit.

20. The electronic system of claim 18, wherein the controller is configured to manage power consumption of the particular subsystem based on the received digitized sensing measurements.

21. The electronic system of claim 18, wherein the digitized sensing measurements comprise one or more of a power supply current measurement, a power supply voltage measurement, or a thermal measurement.

22. An electronic system for performance management comprising:
a plurality of subsystems;
a plurality of analog-to-digital (A/D) converter circuits;
a plurality of trigger circuits, wherein each trigger circuit is to monitor a power consumption level of one or more subsystems of the plurality of subsystems without using the A/D converter circuits, wherein one or more of the trigger circuits comprises a voltage-based comparator with a threshold voltage and whose output is counted against a reference clock and triggers when the monitored power consumption level of the one or more subsystems has exceeded a threshold for a detection duration; and
a controller that is to receive digitized sensing measurements of a particular subsystem from a respective one of the A/D converter circuits when a trigger circuit that is monitoring the particular subsystem is triggered.

23. The electronic system of claim 22, wherein each of the plurality of subsystems is coupled with a respective A/D converter circuit, wherein the sensing measurements of the particular subsystem are generated by its respective A/D converter circuit.

24. The electronic system of claim 22, wherein the controller is configured to manage power consumption of the particular subsystem based on the received digitized sensing measurements.

25. The electronic system of claim 22, wherein the digitized sensing measurements comprise one or more of a power supply current measurement, a power supply voltage measurement, or a thermal measurement.

26. An electronic system comprising:
a subsystem;
an analog-to-digital (A/D) converter sensing circuit that is to obtain digitized sensing measurements of the subsystem;
a trigger circuit that is to monitor a power consumption level of the subsystem, wherein the trigger circuit is to perform an averaging of power switch on-time of a switched-mode power supply (SMPS) to produce an average on-time voltage, and comprises a voltage-based comparator that compares the average on-time voltage with a threshold voltage, to indicate when the trigger circuit is triggered; and
a controller that is to receive the digitized sensing measurements of the subsystem from the A/D converter sensing circuit when the trigger circuit is triggered.

27. The electronic system of claim 26 further comprising a power supply that is to supply power to the subsystem, wherein the power supply comprises the SMPS.

28. The electronic system of claim 26, wherein the trigger circuit monitors the power consumption level of the subsystem without using the A/D converter sensing circuit.

29. The electronic system of claim 28, wherein the trigger circuit is triggered when the monitored power consumption level of the subsystem exceeds a threshold.

30. The electronic system of claim 26, wherein the controller is configured to manage power consumption of the subsystem based on the received digitized sensing measurements.

31. The electronic system of claim 30, wherein the digitized sensing measurements comprise one or more of a power supply current measurement, a power supply voltage measurement, or a thermal measurement.

32. An electronic system comprising:
a subsystem;
an analog-to-digital (A/D) converter sensing circuit that is to obtain digitized sensing measurements of the subsystem;
a trigger circuit that is to monitor a power consumption level of the subsystem, wherein the trigger circuit comprises a counter that counts reference clock cycles between pulses of discontinuous current mode (DCM) operation of a switched-mode power supply (SMPS), to indicate when the trigger circuit is triggered; and
a controller that is to receive the digitized sensing measurements of the subsystem from the A/D converter sensing circuit when the trigger circuit is triggered.

33. The electronic system of claim 32, wherein the trigger circuit monitors the power consumption level of the subsystem without using the A/D converter sensing circuit.

34. The electronic system of claim 32, wherein the trigger circuit is triggered when the monitored power consumption level of the subsystem exceeds a threshold.

35. The electronic system of claim 34 wherein the controller is configured to manage power consumption of the subsystem based on the received digitized sensing measurements.

36. The electronic system of claim 35, wherein the digitized sensing measurements comprise one or more of a power supply current measurement, a power supply voltage measurement, or a thermal measurement.

37. An electronic system comprising:
a subsystem;
an analog-to-digital (A/D) converter sensing circuit that is to obtain digitized sensing measurements of the subsystem;
a trigger circuit that is to monitor a power consumption level of the subsystem, wherein the trigger circuit comprises a voltage-based comparator with a threshold voltage and whose output is counted against a reference clock and triggers when a monitored power consumption level of the subsystem has exceeded a threshold for a detection duration; and
a controller that is to receive the digitized sensing measurements of the subsystem from the A/D converter sensing circuit when the trigger circuit is triggered.

38. The electronic system of claim 37, wherein the trigger circuit monitors the power consumption level of the subsystem without using the A/D converter sensing circuit.

39. The electronic system of claim 38, wherein the trigger circuit is triggered when the monitored power consumption level of the subsystem exceeds a threshold.

40. The electronic system of claim 39 wherein the controller is configured to manage power consumption of the subsystem based on the received digitized sensing measurements.

41. The electronic system of claim 40 wherein the digitized sensing measurements comprise one or more of a power supply current measurement, a power supply voltage measurement, or a thermal measurement.

* * * * *